(12) United States Patent
Jones et al.

(10) Patent No.: US 7,984,136 B2
(45) Date of Patent: Jul. 19, 2011

(54) METHODS, SYSTEMS, AND COMPUTER PROGRAM PRODUCTS FOR DETERMINING LOCATIONS OF INTERCONNECTED PROCESSING MODULES AND FOR VERIFYING CONSISTENCY OF INTERCONNECT WIRING OF PROCESSING MODULES

(75) Inventors: James Gregory Jones, Raleigh, NC (US); Keith John Glidewell, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 2013 days.

(21) Appl. No.: 10/865,136

(22) Filed: Jun. 10, 2004

(65) Prior Publication Data
US 2005/0278566 A1     Dec. 15, 2005

(51) Int. Cl.
*H04L 12/26* (2006.01)

(52) U.S. Cl. ......... 709/224; 709/222; 709/223; 370/254

(58) Field of Classification Search .................. 709/224
See application file for complete search history.

(56) References Cited

U.S. PATENT DOCUMENTS

| | | | |
|---|---|---|---|
| 2003/0079156 A1* | 4/2003 | Sicola et al. ..................... 714/4 |
| 2003/0158933 A1* | 8/2003 | Smith ........................... 709/224 |
| 2005/0243739 A1* | 11/2005 | Anderson et al. ............ 370/254 |
| 2007/0245165 A1* | 10/2007 | Fung ............................ 713/320 |

* cited by examiner

*Primary Examiner* — Kenny S Lin
*Assistant Examiner* — Sulaiman Nooristany
(74) *Attorney, Agent, or Firm* — Jenkins, Wilson, Taylor & Hunt, P.A.

(57) ABSTRACT

Methods, systems, and computer program products for automatically determining locations of interconnected processing modules are disclosed. Physical identifiers are determined for each of a plurality of processing modules connected to each other in a linear topology. Communications are iteratively disabled with each of the processing modules. Discover messages are sent to active, reachable processing modules and responses are received from the active processing modules that receive the discover messages. Based on the number of responses, the location of each processing module is determined.

48 Claims, 5 Drawing Sheets

METHODS, SYSTEMS, AND COMPUTER PROGRAM PRODUCTS FOR DETERMINING LOCATIONS OF INTERCONNECTED PROCESSING MODULES AND FOR VERIFYING CONSISTENCY OF INTERCONNECT WIRING OF PROCESSING MODULES

TECHNICAL FIELD

The present invention relates to methods, systems, and computer program products for determining locations of interconnected processing modules. More particularly, the present invention relates to methods, systems, and computer program products for determining locations of processing modules and verifying the consistency of interconnect wiring between processing modules.

BACKGROUND ART

In distributed processing systems, such as file server systems, multiple separate processing modules may be connected together as a unit to perform a common function. For example, in modern file server systems, multiple file server modules, also referred to as data movers, accept connections from clients, retrieve data from storage, and distribute data to the clients. Such redundancy provides faster service and protection against failure of one or more of the file server modules.

In one conventional multi-file-server system, data movers or file servers do not include individual enclosures and are instead located in a fixed-size cabinet. FIG. 1 illustrates this conventional topology. In FIG. 1, data movers 100, 102, 104, 106, 108, and 110 and control stations 112 and 114 are plugged into slots 116, 118, 120, 122, 124, 126, 128, and 130 in a cabinet 132. Each data mover 100, 102, 104, 106, 108, and 110 performs a file server function. Control stations 114 and 116 control the initialization and overall operation of the data movers. The data movers communicate with clients 134 to serve files stored in RAID arrays 136.

In the topology illustrated in FIG. 1, each data mover is assigned a location-based identifier corresponding to the slot in which it plugs in cabinet 132. For example, data mover 100 plugs into slot 118. Hardware on data mover 100 reads a slot ID of 2 from the connector into which data mover 100 plugs. Similarly, data mover 102 plugs into slot 120, reads the associated location bits, determines that it is plugged into slot number 4 and stores that information. Each data mover performs a similar process and determines its location-based identifier. The data movers can then be addressed by control stations 114 and 116 using these location-based identifiers.

One problem with the topology illustrated in FIG. 1 is that cabinet 132 is expensive and not upward- or downward-scalable to arbitrary numbers of processing modules. Cabinet 132 represents a fixed cost for the equipment purchaser, even if the purchaser does not desire to fill all of the processing module slots. The cost of cabinet 132 may be justified if all of the slots in cabinet 132 are filled with components. However, some purchasers may desire to purchase fewer processing modules than cabinet 132 is designed to accommodate. For such purchasers, buying a cabinet 132 with empty slots is inefficient. Other purchasers may desire to purchase more processing modules than one cabinet 132 is designed to accommodate but fewer processing modules than two cabinets are designed to accommodate. For such purchasers, purchasing two cabinets—one being full and the other with empty slots—is likewise inefficient.

In light of the inefficiencies of providing fixed-size cabinets to house multiple processing modules, it is desirable to design modular processing module enclosures where arbitrary numbers of such processing module enclosures can be connected to each other without requiring a one-size-fits-all cabinet. However, in such a configuration, the processing modules no longer have location-based identifiers because the cabinet is not present to assign the identifiers. Each processing module may have a physical identifier, but the physical identifier does not indicate the processing module's location relative to other processing modules.

Accordingly, there exists a long felt need for methods, systems, and computer program products for assigning location-based identifiers to arbitrary numbers of interconnected processing modules and for verifying consistency of interconnect wiring between the processing modules.

DISCLOSURE OF THE INVENTION

According to one aspect, the present invention may include a method for automatically determining locations of a plurality of interconnected processing modules. One or more processing modules may be located within a physical enclosure. Thus, locating the processing modules also locates the corresponding processing module enclosures. Location-based identifiers may then be assigned to the processing modules, the processing module enclosures, or both.

The method includes determining a physical identifier for each processing module of a plurality of processing modules by broadcasting, from a control station, a discover message to the processing modules requesting that the processing modules identify themselves. The control station next sends a message to the processing modules to disable communications with one of the processing modules. The control station then sends a discover message to non-disabled processing modules reachable from the control station and receives responses from the non-disabled processing modules that receive the discover message. The control station determines, based on the responses, the location of the disabled processing module. The control station then enables communications with the disabled processing module and repeats the steps of iteratively disabling communications with one of the processing modules, sending a discover message to the remaining processing modules reachable from the control station, receiving responses from the reachable processing modules, and determining a location of the disabled processing module based on the responses. Once the location of each of the processing modules has been determined, the control station may assign a location-based identifier to each processing module.

According to another aspect, the present invention includes a method for verifying interconnect wiring between processing modules. The method includes determining physical identifiers for a plurality of first switch modules that connect a plurality of processing modules together in a first network having a linear topology. Next, physical identifiers are determined for a plurality of second switch modules that connect the plurality of processing modules in a second network having a linear topology. Peer relationships between the first and second switch modules are determined. The location of each of the processing modules connected to the first network is determined by iteratively disabling communications each of the first switch modules, broadcasting discover messages to the remaining first switch modules, receiving responses from the first switch modules that are reachable, and determining a location of each of the first switch modules based on the responses. The disabling, broadcasting, receiving, and determining steps are repeated for the second switch modules to determine a location of each of the second switch modules. Wiring inconsistencies between the first and second networks are then determined based on the peer relationships and the locations of the first and second switch modules determined during the tests of the first and second networks.

According to yet another aspect, the present invention includes a system for automatically determining locations of interconnected processing modules. In the system, a plurality of processing modules is connected to each other. A control station determines the physical identifier for each of the processing modules and uses the physical identifier to communicate with the processing modules. The control station iteratively disables communications with each processing module, broadcasts discover messages to the processing modules, receives messages from non-disabled processing modules that receive the discover messages and determines the location of each processing module based on the messages.

The terms "processing module," "switch module," and "control station," as used herein, are intended to refer to components that may be implemented in hardware, software, firmware, or any combination thereof, to perform the indicated function. For example, a processing module that performs a file server function may include a collection of hardware, software, and/or firmware that accepts connections from clients, extracts files requested by the clients from disk storage, and forwards the files to the clients. A control station may be a combination of hardware, software, and/or firmware that performs the steps described herein for assigning location-based identifiers to the processing modules. A switch module may include a collection of hardware, software, and/or firmware that performs link-level frame switching and that receives messages from the control station and performs the functions requested by the control station. In the examples described below, each processing module may include one or more switch modules. Accordingly, the methods, systems, and computer program products described herein may be used to determine locations of processing modules and/or switch modules.

Accordingly, it is an object of the invention to provide methods, systems, and computer program products for determining locations of interconnected processing modules.

It is another object of the invention to provide methods, systems, and computer program products for detecting wiring inconsistencies between processing modules.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
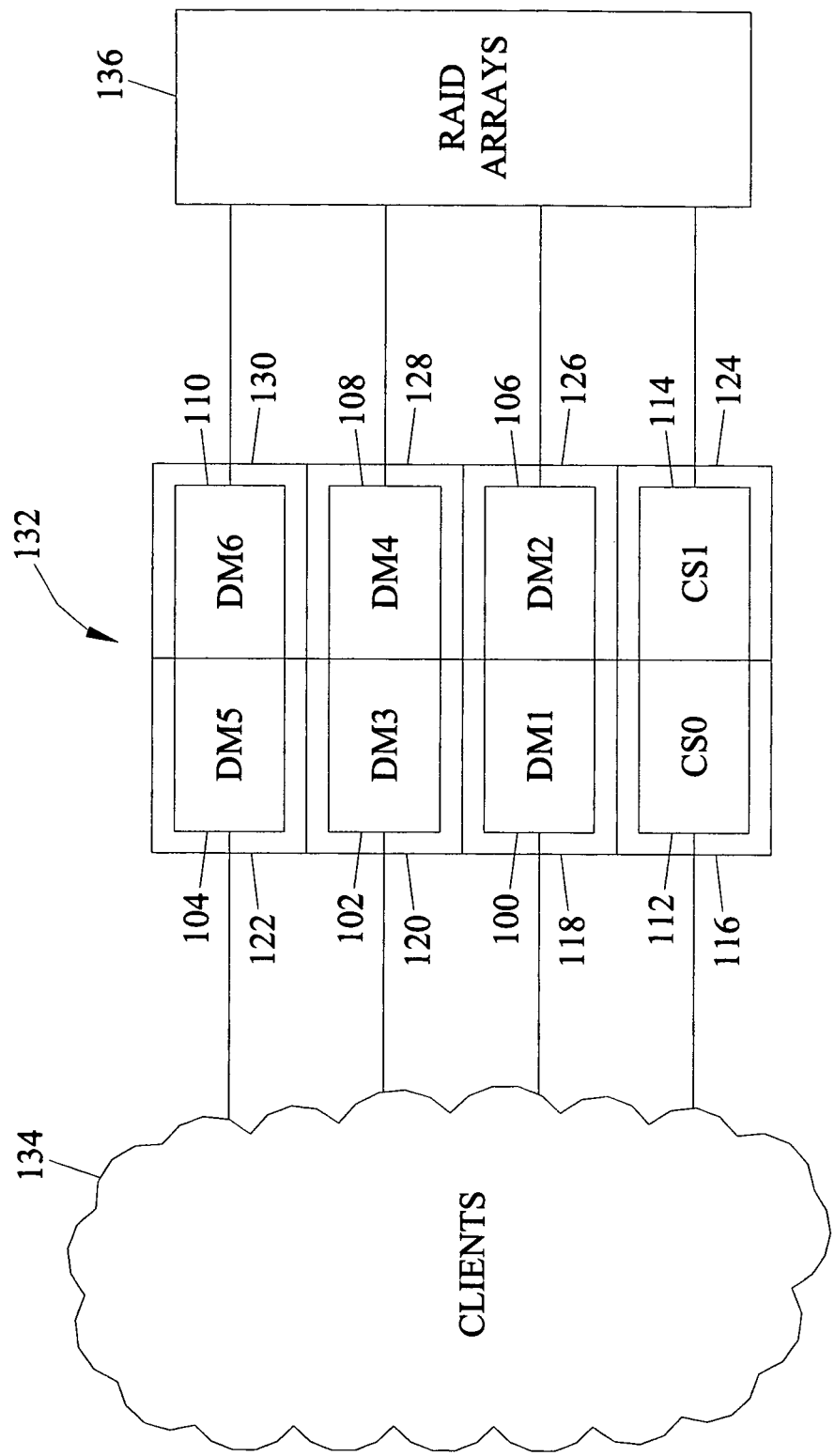
FIG. 1 is a block diagram of a conventional file server system in which file server modules are located in a fixed-size cabinet.
Figure 2:
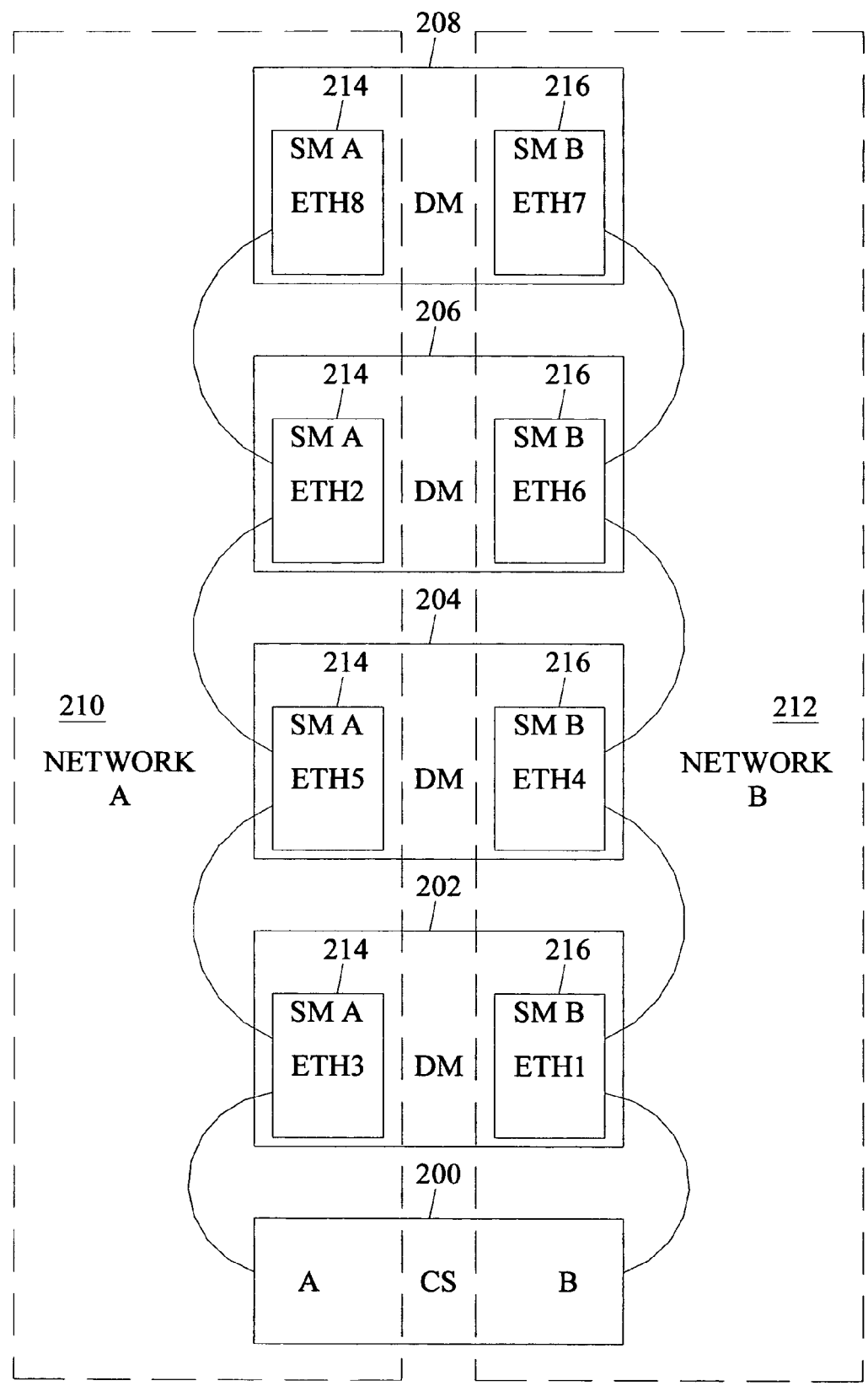
FIG. 2 is a block diagram illustrating processing modules connected to each other in a linear topology according to an embodiment of the present invention.

Methods, systems, and computer program products for automatically determining locations of interconnected processing modules allow processing modules to be placed in modular enclosures and connected together without requiring a fixed-size cabinet. FIG. 2 illustrates a plurality of processing modules connected to each other in a linear topology according to an embodiment of the present invention. In FIG. 2, a control station 200 and processing modules 202, 204, 206, and 208 are connected to each other via network A 210 and network B 212. Control station 200 may include hardware and software for managing processing modules 202, 204, 206, and 208. Each processing module 202, 204, 206, and 208 may include hardware and software for performing any suitable processing function. In one example, each processing module 202, 204, 206, and 208 may be a file server, also referred to as a data mover (DM).

In order to communicate with each other via network A 210 and network B 212, each processing module includes a network A switch module 214 and a network B switch module 216. Switch modules 214 and 216 each include an Ethernet address used for communication with other switch modules. In one implementation, the Ethernet address may be used as a physical identifier for identifying the switch modules.

Figure 3:
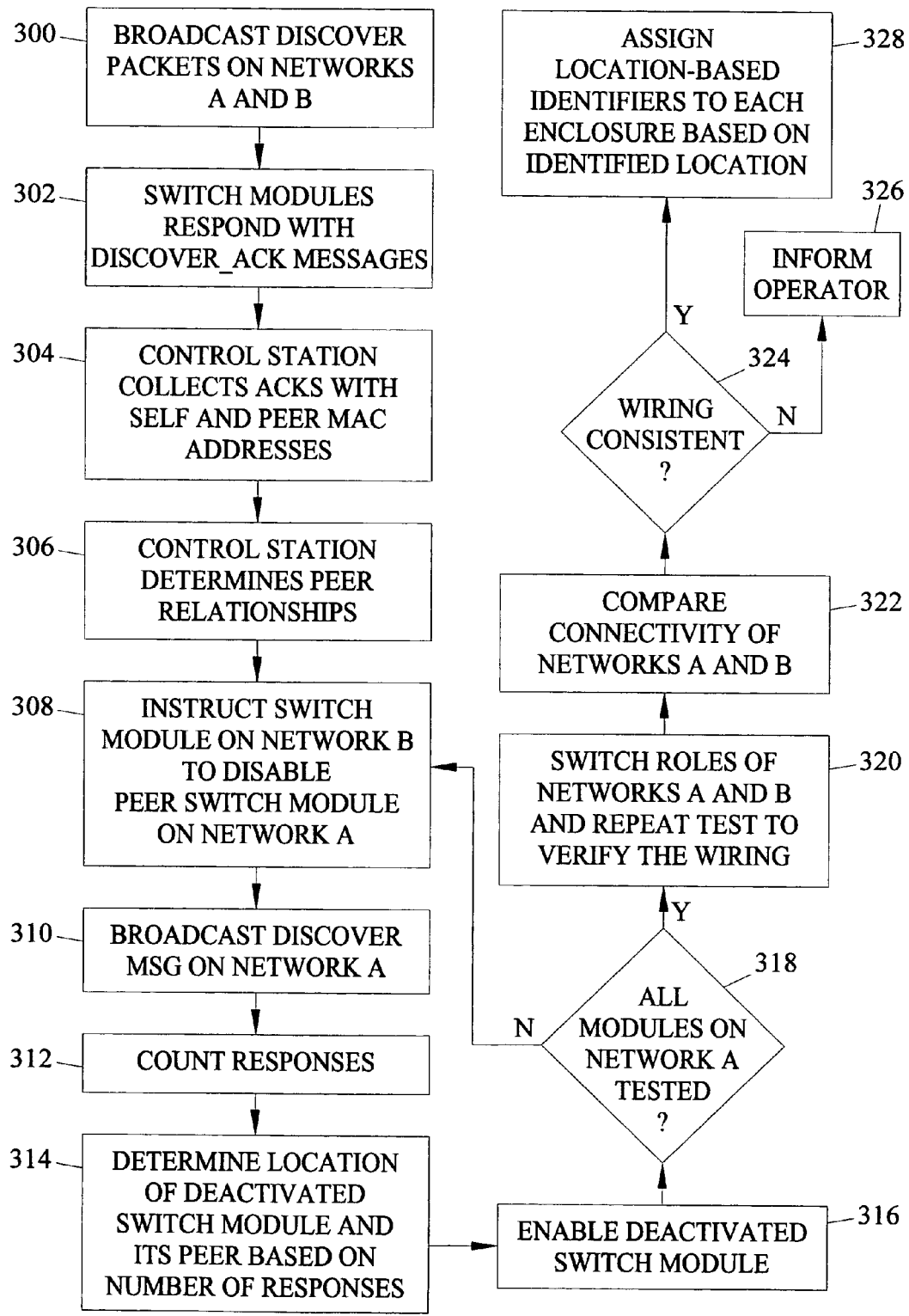
FIG. 3 is a flow chart illustrating exemplary steps for determining locations of interconnected processing modules and for verifying interconnect wiring consistency between processing modules according to an embodiment of the present invention.

In the topology illustrated in FIG. 2, control station 200 and processing modules 202, 204, 206, and 208 are not located in a cabinet that automatically assigns location-based identifiers to the processing modules based on the slot or connector into which the processing modules are connected. Accordingly, it is necessary to provide a mechanism for assigning such identifiers. FIG. 3 is a flow chart illustrating exemplary steps performed by the system illustrated in FIG. 2 in assigning location-based identifiers to the processing modules. Referring to FIG. 3, in step 300, control station 200 broadcasts discover messages on network A and network B. The discover messages may be sent via Ethernet broadcast frames to all of the switch modules connected to networks A and B. The discover messages request that the switch modules send their physical identifiers, peer switch module physical identifiers, and any assigned location-based identifiers. In step 302, the switch modules respond with discover acknowledgment messages. The discover acknowledgment messages include the physical identifier for each switch module, the physical identifier for the peer associated with each switch module, and any previously assigned location-based identifiers. For example, in FIG. 2, switch module A 214 of data mover 202 may respond that its physical identifier is ETH3, its peer's physical identifier is ETH1, and no location-based identifier has been assigned. Similar responses may be received from each switch module in FIG. 2.

In step 304, control station 200 collects the acknowledgment messages with the self and peer physical identifiers. In step 306, control station 200 determines peer relationships. Continuing with the example above, control station 200 may determine that switch module A 214 with Ethernet address ETH3 is a peer of switch module B 216 with an Ethernet address of ETH1. Similar determinations may be made for the remaining switch modules. However, it should be noted that at this point, even though control station 200 knows switch module peer relationships, control station 200 does not know the locations of the switch modules.

In step 308, control station 200 instructs one of the switch modules on network B to disable its peer on network A. For example, control station 200 may send a disable message to Ethernet address ETH1 on network B instructing the switch module having Ethernet address ETH1 to disable its peer switch module on network A having Ethernet address ETH3. However, only the switch module having the Ethernet address ETH1 will process the disable message. In response to receiving the disable message, the processing module having Ethernet address ETH1 will disable its peer having Ethernet address ETH3.

After one of the switch modules on network A has been disabled, in step 310, control station 200 broadcasts a discover message on network A. Even though the discover message is broadcast, only switch modules reachable by the control station will receive the discover message. Using the topology illustrated in FIG. 2 as an example, if the switch module with Ethernet address ETH5 is disabled, because the switch modules are connected in a linear or daisy-chain topology, the switch modules associated with Ethernet address ETH2 and ETH8 will not receive the discover message. In this example, because the switch module with Ethernet address ETH5 is disabled, only the switch module associated with Ethernet address ETH3 will receive the discover message.

As indicated above, the discover message triggers each processing module to respond with its physical identifier, its peer physical identifier, and any assigned location information. In step 312, control station 200 counts the responses received from the switch modules. In step 314, control station 200 determines the location of the deactivated switch module and its peer based on the number of responses. For example, referring back to FIG. 2, if switch module A 214 of processing module 202 is disabled, the discover message sent by control station 200 will be prevented from reaching any of the switch modules on network A. Accordingly, in this example, control station 200 will receive no responses. Since no responses are received, control station 200 can determine that the deactivated switch module is in location 1 in network A, assuming that the processing modules locations are consecutively numbered beginning with location 1 being the closest location to control station 200. If control station 200 receives one response to a discover message, control station 200 may determine that the deactivated switch module is in location 2 in network A. If control station 200 receives two responses, control station 200 may determine that the deactivated switch module is in location 3 in network A. Thus, based on the number of responses, the location of the deactivated switch module can be determined.

Once the location of each deactivated switch module is known, the location of its peer is also known based on the peer information collected in step 304 and determined in step 306. For example, if control station 200 determines that the switch module associated with Ethernet address ETH3 is in location 1, and the switch module associated with Ethernet address ETH1 is the peer of the switch module associated with Ethernet address ETH3, control station 200 may determine that Ethernet address ETH1 is also in location 1. Switch module location information that is deduced based on peer relationships may be verified by executing the corresponding test in network B, as will be described in detail below.

In step 316, control station 200 sends a message on network B to enable the deactivated switch module on network A. In step 318, control station 200 determines whether all switch modules on network A have been tested. If all switch modules on network A have not been tested, steps 308, 310, 312, 314, and 316 are repeated until all switch modules on network A have been tested and a location for each switch module on network A has been determined.

In step 318, if all switch modules on network A have been tested, control proceeds to step 320 where the roles of networks A and B are reversed and steps 308, 310, 312, 314, and 316 are repeated to determine the locations of all switch modules on network B. In step 322, control station 200 compares the connectivity of networks A and B. For example, control station 200 may compare the locations determined during the network A test with the locations determined during the network B test. The locations determined during the network A test should match the locations determined during the network B test. In step 324, if the wiring is determined not to be consistent, control proceeds to step 326 where control station 200 informs an operator of the wiring inconsistency.

If, in step 324, the wiring is determined to be consistent, control proceeds to step 328 where control station 200 automatically assigns location-based identifiers to each processing module and/or processing module enclosure based on the locations identified in step 314. Step 328 may be performed by sending location identification assign messages to each switch module on either network A or network B. The location identification assign message includes a location-based identifier for the corresponding processing module. When each processing module receives the identifier, the processing module stores the identifier in memory. Using the topology illustrated in FIG. 2 as an example, processing module 202 may be assigned a location-based identifier of 1, processing module 204 may be assigned a location-based identifier of 2, processing module 206 may be assigned a location-based identifier of 3, and processing module 208 may be assigned a location-based identifier of 4, indicating the relative locations of the processing modules with regard to control station 200.

Thus, using the steps illustrated in FIG. 3, location-based identifiers can be assigned to processing modules and/or processing module enclosures connected in a linear topology independently of the number of processing modules in the linear topology. In addition, the steps illustrated in FIG. 3 allow wiring consistency to be verified. Because location-based identifiers can be automatically assigned, fixed-size cabinets that assign locations based on card slots are no longer required. As a result, arbitrary numbers of processing modules and/or processing module enclosures can be connected together and automatically assigned location-based identifiers.

Figure 4:
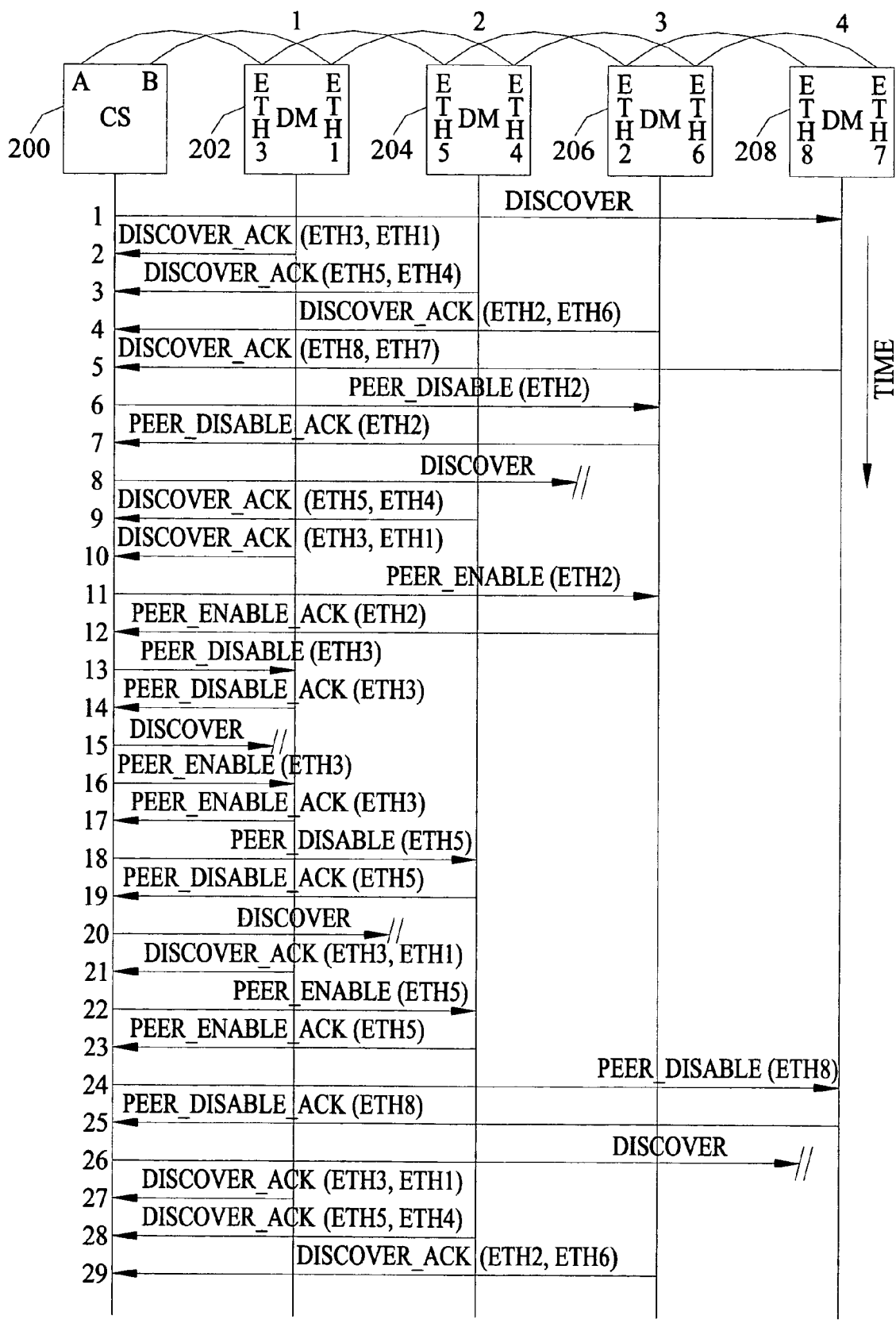
FIG. 4 is a message flow diagram illustrating exemplary messages exchanged in determining the locations of interconnected processing modules according to an embodiment of the present invention.

As described with respect to FIG. 3, location-based identifiers may be assigned to processing modules and/or processing module enclosures through a protocol in which the control station exchanges messages with the processing modules to determine their locations. FIG. 4 is a message flow diagram illustrating exemplary messages that may be exchanged between control station 200 and processing modules 202, 204, 206, and 208 in determining the location of each processing module on network A according to an embodiment of the present invention. Referring to FIG. 4, in line 1 of the message flow diagram, control station 200 broadcasts a discover message on network A requesting the physical identifier of each of the processing modules. In lines 2-5 of the message flow diagram, each switch module on network A responds with its Ethernet address and its peer's Ethernet address. For example, the network A switch module of processing module 202 responds with a discover acknowledgment message with Ethernet address ETH3 as the network A Ethernet address and Ethernet address ETH1 as the peer Ethernet address on network B. In line 6 of the message flow diagram, control station 200 sends a peer disable message to the switch module associated with ETH6 instructing the switch module to disable its peer switch module with Ethernet address ETH2. In the drawings, the Ethernet address in parenthesis following the PEER_DISABLE message is intended to illustrate the Ethernet address being disabled. This notation is not intended to indicate that the Ethernet address is a parameter to the PEER_DISABLE message since each switch module has only one peer.

In line 7 of the message flow diagram, the switch module having the Ethernet address ETH6 associated with processing module 206 responds with a peer disable acknowledgment message indicating that the switch module having the Ethernet address ETH2 has been disabled.

In line 8 of the message flow diagram, control station 200 broadcasts a discover message on network A. However, because the switch module associated with Ethernet address ETH2 is disabled, the discover message will not reach processing modules 206 or 208. Accordingly, in lines 9 and 10 of the message flow diagram, only the switch modules associated with processing modules 202 and 204 respond to the discover message. After line 10 of the message flow diagram, since two responses have been received, control station 200 may determine that Ethernet address ETH2 is in location 3.

In line 11 of the message flow diagram, control station 200 sends a peer enable message to the peer of Ethernet address ETH2 on network B to enable the switch module associated with Ethernet address ETH2. As with the PEER_DISABLE message, the Ethernet address shown in parenthesis after the PEER_ENABLE message in the drawings is intended to represent the Ethernet address of the switch module being enabled. The address is shown for clarity to indicate the Ethernet address being enabled and is not necessarily a parameter of the PEER_ENABLE message, since each switch module has only one peer.

In line 12 of the message flow diagram, the peer switch module of Ethernet address ETH2 responds with a peer enable acknowledgment message indicating that the switch module associated with Ethernet address ETH2 has been enabled.

In line 13 of the message flow diagram, control station 200 sends a peer disable message to the peer of Ethernet address ETH3 on network B for disabling switch module associated with the Ethernet address ETH3 on network A. In line 14 of the message flow diagram, the peer of Ethernet address ETH3 responds with a peer disable acknowledgment message indicating that the switch module associated with Ethernet address ETH3 has been disabled. In line 15 of the message flow diagram, control station 200 sends a discover message on network A. However, because switch module on network A associated with Ethernet address ETH3 is disabled, the discover message does not reach any of the switch modules on network A. Accordingly, control station 200 does not receive any responses to the discover message, and control station 200 can determine after line 15 of the message flow diagram that the Ethernet address ETH3 is in location 1.

In line 16 of the message flow diagram, control station 200 sends a peer enable message to the peer of Ethernet address ETH3 on network B to enable the switch module associated with Ethernet address ETH3 on network A. In line 17 of the message flow diagram, the peer of Ethernet address ETH3 on network B sends a peer enable acknowledgment message to control station 200 indicating that the switch module associated with Ethernet address ETH3 has been re-enabled. In line 18 of the message flow diagram, control station 200 sends a peer disable message to the peer of the switch module associated with Ethernet address ETH5 on network B. In line 19 of the message flow diagram, the switch module associated with Ethernet address ETH4 sends a peer disable acknowledgment message to control station 200 indicating that the switch module associated with Ethernet address ETH5 has been disabled. In line 20 of the message flow diagram, control station 200 broadcasts a discover message to all switch modules on network A. The discover message only reaches the switch module associated with Ethernet address ETH3 202 because the switch module associated with Ethernet address ETH5 has been disabled, making switch modules downstream from Ethernet address ETH5 unreachable from control station 200. Accordingly, in line 21 of the message flow diagram, control station 200 receives one response. After line 21, control station 200 can determine that Ethernet address ETH5 is located in location 2.

In line 22 of the message flow diagram, control station 200 sends a peer enable message to the peer of Ethernet address ETH5 on network B for enabling the switch module associated with Ethernet address ETH5 on network A. In line 23 of the message flow diagram, the switch module associated with Ethernet address ETH4 responds with a peer enable acknowledgment message indicating that the switch module associated with Ethernet address ETH5 has been enabled.

After line 23 of the message flow diagram, the processing associated with determining switch module locations may stop, since three of the four processing module locations have been determined. The remaining processing module may be assigned the remaining undetermined location. However, in one implementation, the process may continue using similar steps to determine and verify the location of the remaining processing module. Accordingly, in line 24 of the message flow diagram, control station 200 sends a peer disable message to the peer of Ethernet address ETH8 on network B for disabling the switch module associated with Ethernet address ETH8. In line 25 of the message flow diagram, the switch module associated with Ethernet address ETH7 sends a peer disable acknowledgment message indicating that the switch module associated with Ethernet address ETH8 has been disabled. In line 26 of the message flow diagram, control station 200 sends a discover message on network A. The discover message is received by all of the switch modules on network A except for the switch module associated with ETH8. Accordingly, in lines 27-29 of the message flow diagram, control station 200 receives three responses. After line 29 of the message flow diagram, control station 200 can determine that the switch module associated with Ethernet address ETH8 is in location 4, based on the number of responses received in lines 27-29.

In general, control station 200 may determine the location of the disabled switch module based on the number of responses received in response to a discover message. If the number of responses is n, n being an integer, control station 200 may determine that the disabled switch module is located in the $(n+1)^{th}$ location. Using the number of responses to determine the location of the disabled switch module provides a simple, but elegant solution. However, the present invention is not limited to only using the number of responses to determine the location. For example, the content of the responses, such as the self and peer Ethernet addresses in each discover acknowledgment message, may be used alone or in combination with peer relationships determined in response to the initial discover message to more quickly deduce the location of the disabled switch module. For example, if switch modules A and B respond to a discover message, it can be determined not only that the disabled switch module is in the third location, but also that switch modules A and B are in locations before the third location. This information can be used to limit the number of iterations required to determine all of the switch module locations. Using information in discover acknowledgement messages to determine switch module locations makes the algorithm more complex but reduces the number of iterations required to locate all of the switch modules over an implementation that uses only the number of responses.

The content of the discover acknowledgement messages can also be used to expedite detection of wiring inconsistencies. For example, as described above with regard to FIG. 3, wiring inconsistencies can be determined by counting responses to discover messages on networks A and B, determining the processing module locations based on the number of responses, and comparing locations of processing modules determined during the network A test with the locations determined during the network B test. Analyzing the content of the discover messages can be used to reduce the number of iterations required for the testing on each network. In addition, if a switch module is unreachable on one network due to a wiring inconsistency, its location may be determined by analyzing the content of discover acknowledgement messages on the other network.

The steps illustrated in FIG. 4 may be repeated to determine locations for each switch module on network B. The switch module locations on networks A and B may be compared for wiring consistency. Locations for the switch modules on network B may be compared to the locations determined for the switch modules on network A and the peer relationships determined during the initial discovery process. If the locations on network B match the locations determined on network A, wiring consistency may be indicated. If the locations on network B do not match the locations on network A, wiring inconsistency may be indicated.

Figure 5:
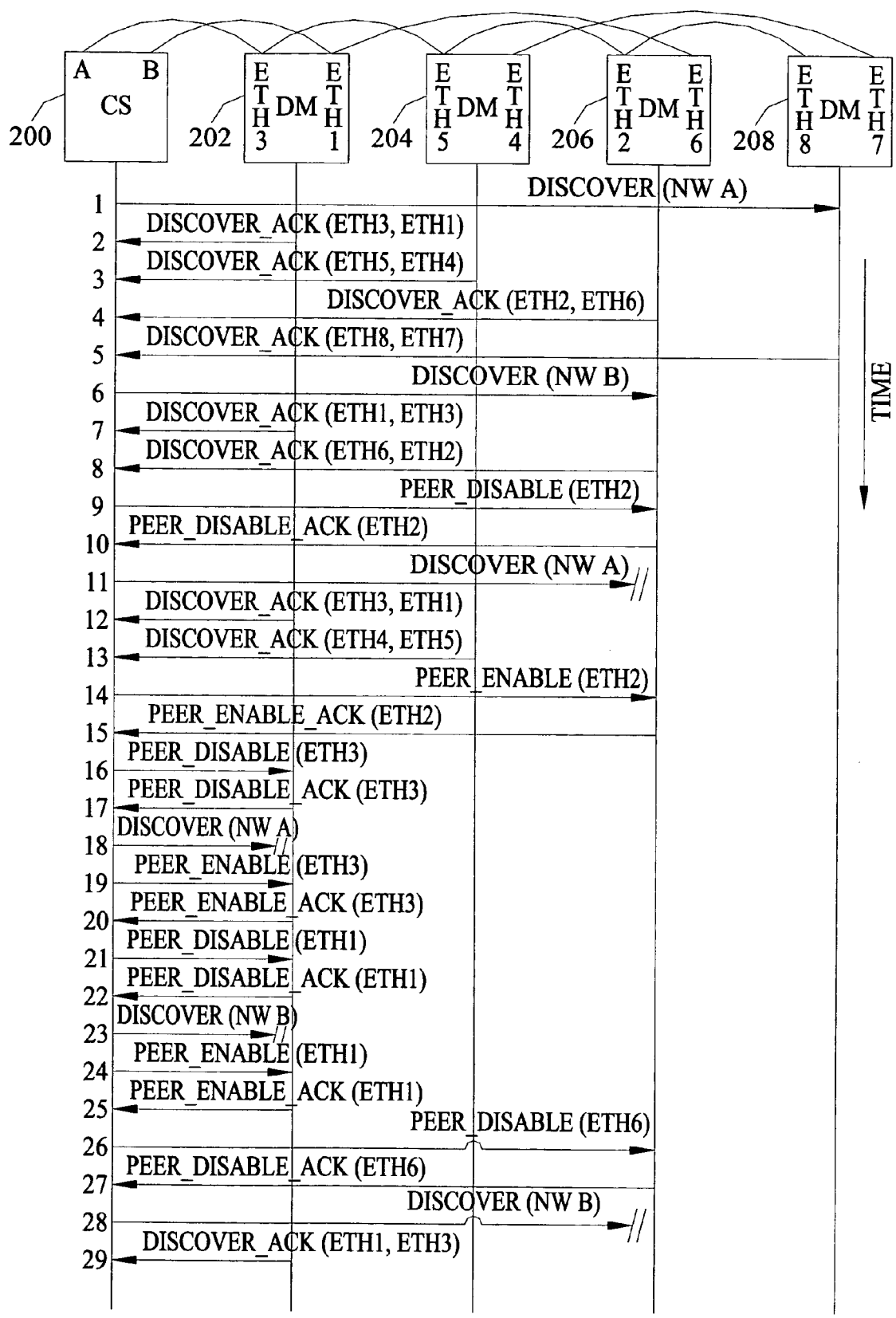
FIG. 5 is a message flow diagram illustrating exemplary messages exchanged in verifying interconnect wiring consistency of interconnected processing modules according to an embodiment of the present invention.

In order to further illustrate the method for verifying wiring consistency, or determining wiring inconsistency, an example where processing modules are inconsistently wired will now be presented. FIG. 5 illustrates an example in which the switch modules in network A are wired inconsistently with the switch modules in network B. More particularly, referring to the example illustrated in FIG. 5, rather than being connected in series consistently with the switch modules in network A, in network B, the switch module associated with Ethernet address ETH1 is connected to the switch module associated with Ethernet address ETH6. In addition, the switch module associated with Ethernet address ETH4 is connected to Ethernet address ETH7. As a result, the switch modules associated with Ethernet addresses ETH4 and ETH7 are unreachable by control station 200 on network B.

In the message flow illustrated in FIG. 5, the process for verifying wiring consistency starts in line 1 with the broadcast of a discover message on network A. Since all of the switch modules on network A are reachable, each switch module responds in lines 2-5 with a discover acknowledgment message indicating its Ethernet address and its peer switch module's Ethernet address.

In line 6 of the message flow diagram, control station 200 broadcasts a discover message on network B. However, because the switch modules associated with Ethernet address ETH4 and ETH7 are not reachable, the discover message only reaches the switch modules associated with addresses ETH1 and ETH6. In lines 7 and 8 of the message flow diagram, these switch modules respond with their Ethernet addresses and their peer switch module Ethernet addresses.

After line 8 of the message flow diagram, control station 200 may determine that the processing modules are wired inconsistently due to the fact that more discover acknowledgment messages were received on network A than network B and may inform the operator immediately without further consistency checking. However, as illustrated in FIG. 5, one exemplary method for detecting wiring inconsistencies may include discovering locations of the switch modules on networks A and B by testing the switch modules on network A, discovering locations of switch modules on networks A and B by testing the switch modules on network B, and comparing the results of the network A test with the results of the network B test. In line 9 of the message flow diagram, control station 200 begins the network A test by sending a peer disable message to Ethernet address ETH6 on network B to disable the switch module associated with Ethernet address ETH2 on network A. In line 10 of the message flow diagram, control station 200 receives a peer disable acknowledgment message indicating that the switch module on network A associated with Ethernet address ETH2 has been disabled.

In line 11 of the message flow diagram, control station 200 broadcasts a discover message to the switch modules on network A. In lines 12 and 13 of the message flow diagram, the switch modules associated with data movers 202 and 204 respond with discover acknowledgment messages. Accordingly, after line 13 of the message flow diagram, control station 200 may determine that the Ethernet address ETH2 is located in location number 3.

In line 14 of the message flow diagram, control station 200 sends a peer enable message to Ethernet address ETH6 for enabling the previously disabled switch module having Ethernet address ETH2. In line 15 of the message flow diagram, the switch module responds indicating that Ethernet address ETH2 has been enabled. In line 16 of the message flow diagram, control station 200 sends a peer disable message for disabling Ethernet address ETH3. In line 17 of the message flow diagram, the switch module associated with Ethernet address ETH1 responds with a peer disable acknowledgment message indicating that Ethernet address ETH3 has been disabled. In line 18 of the message flow diagram, control station 200 broadcasts a discover message on network A. However, because Ethernet address ETH3 is disabled, the discover message will not reach any of the switch modules. Accordingly, after line 18, control station 200 may determine that the switch module associated with Ethernet address ETH3 is in location 1 on network A.

In line 19 of the message flow diagram, control station 200 sends a peer enable message to the peer associated with Ethernet address ETH3 for enabling Ethernet address ETH3. In line 20 of the message flow diagram, the peer of the switch module associated with Ethernet address ETH3 sends a peer enable acknowledgment message to control station 200 indicating that the switch module associated with Ethernet address ETH3 has been enabled.

After line 20 of the message flow diagram, further testing of the switch modules on network A cannot be performed since Ethernet addresses ETH4 and ETH7 are not reachable on network B. Accordingly, after line 20 of the message flow diagram, control station 200 may begin testing the switch modules on network B. The network B test begins in line 21 of the message flow diagram where control station 200 sends a peer disable message for disabling Ethernet address ETH1. In line 22 of the message flow diagram, the peer of Ethernet address ETH1 on network A responds with a peer disable acknowledgment message indicating that the switch module associated with Ethernet address ETH1 has been disabled. In line 23 of the message flow diagram, control station 200 broadcasts a discover message on network B. Because the switch module associated with Ethernet address ETH1 has been disabled, the discover message will not reach any of the switch modules on network B, and no responses will be sent in response to the discover message. Accordingly, after line 23 of the message flow diagram, control station 200 may determine that the switch module associated with Ethernet address ETH1 is in location 1.

In line 24 of the message flow diagram, control station 200 sends a peer enable message to the switch module associated with Ethernet address ETH3 for enabling the switch module associated with Ethernet address ETH1. In line 25 of the message flow diagram, the recipient switch module responds with a peer enable acknowledgment message indicating that Ethernet address ETH1 has been enabled.

In line 26 of the message flow diagram, control station 200 sends a peer disable message on network A for disabling the switch module associated with Ethernet address ETH6 on network B. In line 27 of the message flow diagram, the switch module associated with Ethernet address ETH2 responds with a peer disable acknowledgment message indicating that Ethernet address ETH6 has been disabled. In line 28 of the message flow diagram, control station 200 broadcasts a discover message on network B. The discover message only reaches the switch module associated with Ethernet address ETH1 because the switch modules associated with Ethernet address ETH4 and Ethernet address ETH7 are unreachable from control station 200 on network B due to the incorrect wiring. The switch module associated with Ethernet address ETH6 is unreachable because it has been disabled. Accordingly, in line 29 of the message flow diagram, control station 200 receives a single response to the discover message.

After line 29 of the message flow diagram, control station 200 may determine that the switch module associated with Ethernet address ETH6 is in location 2 of the network. In the wiring illustrated in FIG. 5, since ETH6 is the second reachable processing module in network B, this determination is correct. However, this determination is inconsistent with the wiring of network A and with the peer information received in line 4 of the message flow diagram in FIG. 5. Accordingly, after line 29 of the message flow diagram, control station 200 may determine that networks A and B are inconsistently wired. Control station 200 may display results of the test illustrated in FIG. 5 to the network operator so that the network operator can identify the particular inconsistencies.

Table 1 shown below illustrates an example of the data that may be known after the steps illustrated in FIG. 5 have been completed.

TABLE 1

Processing Module Peer and Location Data

| Ethernet Addr | Network | Peer | Loc after NW A Test | Loc after NW B Test |
|---|---|---|---|---|
| ETH1 | B | eth3 | 1 | 1 |
| ETH2 | A | eth6 | 3 | 2 |
| ETH3 | A | eth1 | 1 | 1 |
| ETH4 | B | eth5 | | |
| ETH5 | A | eth4 | | |
| ETH6 | B | eth2 | 3 | 2 |
| ETH7 | B | eth8 | | |
| ETH8 | A | eth7 | | |

In Table 1, it can be seen that a wiring inconsistency would be detected because Ethernet address ETH6 is identified based on the network A test to be in location 3 but after the network B test to be in location 2. Similarly, the switch module associated with Ethernet address ETH2 is identified as being in location 3 after the network A test and in location 2 after the network A test. Accordingly, after receiving data such as that illustrated in Table 1, the operator may determine that a wiring inconsistency exists.

Thus, as described above, the present invention includes methods, systems, and computer program products for automatically determining locations of interconnected processing modules. By automatically discovering the location of each processing module using a novel message exchange system, the present invention allows arbitrary numbers of modular processing modules to be connected together without expensive cabinets or connectors to assign location-based processing module identifiers. In addition, the methods, systems, and computer program products described herein can be used to detect wiring inconsistencies between processing modules.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for automatically determining locations of a plurality of interconnected processing modules, the method comprising:
(a) determining a physical identifier for each processing module of a plurality of interconnected processing modules;
(b) disabling communications with one of the processing modules such that communications with the one processing module are disabled on a first network, processing modules upstream from the one processing module are reachable by a control station on the first network, and processing modules downstream from the one processing module are not reachable by the control station on the first network;
(c) sending a discover message to non-disabled processing modules reachable from the control station and receiving responses from the non-disabled processing modules that receive the discover message;
(d) determining, based on the responses, a location of the disabled processing module;
(e) enabling communications with the disabled processing module; and
(f) repeating steps (b)-(e) for each of the processing modules to determine a location for each of the processing modules.

2. The method of claim 1 wherein determining a physical identifier for each processing module includes broadcasting a discover message to the processing modules, receiving a response to the discover message from each of the processing modules, and determining the physical identifiers based on the responses.

3. The method of claim 2 wherein the processing modules are each connected to the first network and to a second network and wherein broadcasting a discover message includes broadcasting a discover message to the processing modules over the first network and over the second network, receiving responses from the processing modules through the first and second networks, and determining first physical identifiers for the processing modules in the first network and second physical identifiers for the processing modules in the second network.

4. The method of claim 3 comprising pairing physical identifiers of the processing modules in the first and second networks based on peer information received from the first and second networks.

5. The method of claim 4 wherein performing steps (a)-(f) includes performing steps (a)-(f) in each of the first and second networks to determine locations for the processing modules in the first and second networks.

6. The method of claim 5 comprising comparing the locations determined for the processing modules in the first network with the locations determined for the processing modules in the second network to verify consistency of processing module interconnection in the first and second networks.

7. The method of claim 3 wherein disabling communications with one of the processing modules includes sending a disable message to a switch module associated with a processing module in the second network for disabling a switch module associated with the processing module in the first network.

8. The method of claim 7 wherein sending a disable message includes sending the disable message addressed to an Ethernet address of a peer switch module in the second network to the switch module being disabled in the first network.

9. The method of claim 1 wherein determining a location of each of the processing modules based on the responses includes counting a number of responses received in response to the discover message and determining the location of the disabled processing module based on the number of responses.

10. The method of claim 9 wherein determining a location of the disabled processing module based on the number of responses includes receiving N responses from the processing modules, N being an integer, and determining that the disabled processing module is the $(N+1)^{th}$ location based on receiving N responses.

11. The method of claim 1 comprising assigning a location-based identifier to each of the processing modules based on the location determined for each of the processing modules.

12. The method of claim 1 wherein determining a location of each of the processing modules based on the responses includes extracting content from the responses and using the content to determine the location of each of the processing modules.

13. The method of claim 12 wherein the content includes a physical identifier for each of the processing modules and wherein using the content to determine the location of each of the processing modules includes using the physical identifiers in combination with the number of responses to determine the location of each of the processing modules.

14. The method of claim 1 wherein the processing modules are located in processing module enclosures and wherein the method further comprises assigning location-based identifiers to the processing module enclosures based on the locations determined for the processing modules.

15. A method for verifying wiring consistency between processing modules connected by first and second networks, the method comprising:
(a) determining physical identifiers for a plurality of first switch modules that connect a plurality of processing modules together in a first network;
(b) determining physical identifiers for a plurality of second switch modules that connect the plurality of processing modules together in a second network;
(c) determining peer relationships between the first and second switch modules;
(d) iteratively: disabling communications with each of the first switch modules such that, in each iteration, communications with a different one of the first switch modules are disabled on the first network, first switch modules upstream from the one first switch module are reachable on the first network, and first switch modules downstream from the one first switch module are not reachable on the first network; broadcasting discover messages to the first switch modules; receiving responses from the first switch modules that receive the discover messages; and determining a location of each of the first switch and second modules based on the responses and the peer relationships;
(e) iteratively: disabling communications with each of the second switch modules such that, in each iteration, communications with a different one of the second switch modules are disabled on the second network, switch modules upstream from the one second switch module are reachable on the second network, and second switch modules downstream from the one second switch module are not reachable on the second network; broadcasting discover messages to the second switch modules; receiving responses from the second switch modules that receive the discover messages; and determining a location of each of the first and second switch modules based on the responses and the peer relationships; and
(f) detecting wiring inconsistencies between the first and second networks based on the peer relationships and the locations determined for the first and second switch modules.

16. The method of claim 15 wherein determining physical identifiers for the first and second switch modules includes broadcasting discover messages on the first and second networks, receiving responses to the discover messages, and extracting the physical identifiers from the responses.

17. The method of claim 16 wherein broadcasting discover messages on the first and second networks includes sending Ethernet broadcast messages over the first and second networks.

18. The method of claim 15 wherein iteratively disabling communications with each of the first and second switch modules includes sending a disable message addressed to the physical identifier of a peer of a switch module being disabled.

19. The method of claim 15 wherein detecting wiring inconsistencies includes comparing locations of the first and second switch modules determined in steps (d) and (e) and detecting inconsistencies based on the comparisons.

20. The method of claim 15 wherein determining locations of each of the first and second switch modules based on the responses and the peer relationships includes determining the locations based on content of the responses.

21. The method of claim 15 wherein determining locations of each of the first and second switch modules based on the responses and the peer relationships includes determining the locations based the number of responses received in response to each discover message.

22. The method of claim 15 wherein determining locations of each of the first and second switch modules based on the responses and the peer relationships includes determining the locations based the number of responses received in response to each discover message and content of each response.

23. A system for automatically determining locations of interconnected processing modules, the system comprising:
a plurality of processing modules connected to each other, each processing module including hardware and having a physical identifier; and
a control station coupled to the processing modules for determining the physical identifier of each processing module, for disabling communications with one of the processing modules on a first network such that communications with the one processing module are disabled on the first network, processing modules upstream from the one processing module are reachable by the control station on the first network, and processing modules downstream from the one processing module are not reachable by the control station on the first network and for sending a discover message to the non-disabled processing modules reachable from the control station, receiving responses from the non-disabled processing modules that receive the discover message, determining, based on the responses, a location of the disabled processing module, enabling communications with the disabled processing module and repeating, for each of the processing modules, the disabling of one of the processing modules, the sending of the discover message, the receiving of the responses, the determining, based on the responses, the location of the disabled processing module, and the enabling of communications with the disabled processing module to determine the location of each of the processing modules.

24. The system of claim 23 wherein the processing modules comprise file servers.

25. The system of claim 23 wherein the processing modules each include first and second switch modules for interconnecting the processing modules via the first and network and via a second network.

26. The system of claim 25 wherein the control station is adapted to determine locations for the first switch modules the second switch modules by testing the first switch modules in the first network.

27. The system of claim 26 wherein the control station is adapted to determine locations for the first and second switch modules by testing the second switch modules in the second network.

28. The system of claim 27 wherein the control station is adapted to verify consistency between locations of the first and second switch modules in the first and second networks by comparing results of the tests performed in the first and second networks.

29. The system of claim 23 wherein the control station is adapted to determine the location of each of the processing modules based on a number of responses received from the processing modules.

30. The system of claim 23 wherein the control station is adapted to determine the location of each of the processing modules based on content of responses received from the processing modules.

31. The system of claim 23 wherein the control station is adapted to determine the location of each of the processing modules based on content of the responses and a number of the responses received from the processing modules.

32. The system of claim 23 wherein the control station is adapted to determine that a processing module is located in a $(N+1)^{th}$ location based on receiving N responses from the processing modules, N being an integer.

33. The system of claim 23 wherein the control station is adapted to assign location-based identifiers to the processing modules based on the locations determined for the processing modules.

34. The system of claim 23 comprising a plurality of enclosures associated with the processing modules, wherein the control station is adapted to assign location-based identifiers to the enclosures based on the locations determined for the processing modules.

35. A non-transitory computer readable storage medium having stored thereon executable instructions that when executed by the processor of a computer control the computer to perform steps comprising:
  determining a physical identifier for each processing module of a plurality of interconnected processing modules;
  disabling communications with one of the processing modules such that communications with the one processing module are disabled on a first network, processing modules upstream from the one processing module are reachable by the control station on the first network, and processing modules downstream from the one processing module are not reachable by a control station on the first network;
  sending a discover message to non-disabled processing modules reachable from the control station and receiving responses from the non-disabled processing modules that receive the discover message;
  determining, based on the responses, a location of the disabled processing module;
  enabling communications with the disabled processing module; and
  repeating steps (b)-(e) for each of the processing modules to determine a location for each of the processing modules.

36. The non-transitory computer readable storage medium of claim 35 wherein determining a physical identifier for each processing module includes broadcasting a discover message to the processing modules, receiving a response to the discover message from each of the processing modules, and determining the physical identifiers based on the responses.

37. The non-transitory computer readable storage medium of claim 36 wherein the processing modules are each connected to the first network and to a second network and wherein broadcasting a discover message includes broadcasting a discover message to the processing modules over the first network and over the second network, receiving responses from the processing modules through the first and second networks, and determining first physical identifiers for the processing modules in the first network and second physical identifiers for the processing modules in the second network.

38. The non-transitory computer readable storage medium of claim 37 comprising pairing physical identifiers of the processing modules in the first and second networks based on peer information received from the first and second networks.

39. The non-transitory computer readable storage medium of claim 38 wherein performing steps (a)-(f) includes performing steps (a)-(f) in each of the first and second networks to determine locations for the processing modules in the first and second networks.

40. The non-transitory computer readable storage medium of claim 39 comprising comparing the locations determined for the processing modules in the first network with the locations determined for the processing modules in the second network to verify consistency of processing module interconnection in the first and second networks.

41. The non-transitory computer readable storage medium of claim 37 wherein disabling communications with one of the processing modules includes sending a disable message to a switch module associated with a processing module in the second network for disabling a switch module associated with the processing module in the first network.

42. The non-transitory computer readable storage medium of claim 41 wherein sending a disable message includes sending the disable message addressed to an Ethernet address of a peer switch module in the second network to the switch module being disabled in the first network.

43. The non-transitory computer readable storage medium of claim 35 wherein determining a location of each of the processing modules based on the responses includes counting a number of responses received in response to the discover message and determining the location of the disabled processing module based on the number of responses.

44. The non-transitory computer readable storage medium of claim 43 wherein determining a location of the disabled processing module based on the number of responses includes receiving N responses from the processing modules, N being an integer, and determining that the disabled processing module is the $(N+1)^{th}$ location based on receiving N responses.

45. The non-transitory computer readable storage medium of claim 35 wherein determining a location of the disabled processing module based on the responses includes determining a location of the disabled processing module based on content of the responses.

46. The non-transitory computer readable storage medium of claim 35 wherein determining a location of the disabled processing module based on the responses includes determining a location of the disabled processing module based on content of the responses and the number of responses.

47. The non-transitory computer readable storage medium of claim 35 comprising assigning a location-based identifier to each of the processing modules based on the location determined for each of the processing modules.

48. The non-transitory computer readable storage medium of claim 35 wherein the processing modules each include an enclosure and wherein the computer program product further comprises computer-executable instructions for performing the step of assigning a location-based identifier to each of the processing module enclosures based on the locations determined for the processing modules.

* * * * *